0

(12) United States Patent
Furtado et al.

(10) Patent No.: US 8,776,340 B2
(45) Date of Patent: Jul. 15, 2014

(54) METHOD FOR REPLACING TUBES IN A REFORMING UNIT

(75) Inventors: Jader Furtado, Saint Germain-en-Laye (FR); Sophie Wastiaux, Aulnay-Sous-Bois (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 848 days.

(21) Appl. No.: 12/520,123

(22) PCT Filed: Dec. 19, 2007

(86) PCT No.: PCT/FR2007/052560
§ 371 (c)(1),
(2), (4) Date: Jan. 15, 2010

(87) PCT Pub. No.: WO2008/084172
PCT Pub. Date: Jul. 17, 2008

(65) Prior Publication Data
US 2010/0132179 A1    Jun. 3, 2010

(30) Foreign Application Priority Data
Dec. 21, 2006 (FR) ...................................... 0655815

(51) Int. Cl.
*B23P 6/00* (2006.01)

(52) U.S. Cl.
USPC .................. 29/402.08; 29/402.03; 29/402.01; 29/592; 29/402.07; 29/402.09

(58) Field of Classification Search
USPC ............... 29/402.08, 402.11, 402.03, 402.01, 29/592, 402.13, 402.16, 402.07, 402.09
See application file for complete search history.

(56) References Cited

U.S. PATENT DOCUMENTS

| 3,607,130 | A | 9/1971 | Worley et al. |
| 4,161,510 | A | 7/1979 | Edridge |
| 6,789,428 | B2 * | 9/2004 | Nishimura et al. ............. 73/627 |
| 2005/0237519 | A1 * | 10/2005 | Bondurant et al. ........ 356/241.1 |
| 2005/0277797 | A1 | 12/2005 | Maeda et al. |
| 2006/0050092 | A1 * | 3/2006 | Bondurant et al. ........... 345/664 |

FOREIGN PATENT DOCUMENTS

FR   2888920   1/2007
GB   1149163   4/1969

OTHER PUBLICATIONS

Brian Shannon, 'A Comprehensive Approach to Reformer Tube Inspection and Assessment' NDT.net—Jun. 2004—vol. 9 No. 06.*
http://en.wikipedia.org/wiki/Percentage-last updated Apr. 25, 2012.*
ECCC Recommendations—vol. 6 [ Issue 1] Jul. 27, 2005 Residual Life Assessment and microstructure.*
Brian Shannon,'A Comprehensive Approach to Reformer Tube Inspection and Assessment' NDT.net—Jun. 2004—vol. 9 No. 06.*
Peter Seliger,"Life Assessmentof Creep Exposed Components" OMMI ( vol. 1, Issue 2) Aug. 2002.*
Brian Shannon,'A comprehensive Approach to Reformer Tube Inspection and Assessment' NDT.net—June2004—vol.—No. 06.*
Peter Seliger,"Life Assessment of Creep Exposed Components" OMMI ( vol. I, Issue 2) Aug. 2002.*
Written Opinion of PCT/FR2007/052560 (French and English).
Search Report for PCT/FR2007/052560.

* cited by examiner

*Primary Examiner* — Peter DungBa Vo
*Assistant Examiner* — Azm Parvez
(74) *Attorney, Agent, or Firm* — Justin K. Murray; Elwood L. Haynes

(57) ABSTRACT

The invention relates to a method for replacing tubes in a hydrocarbon-vapor reforming unit, that comprises before launching any new production campaign: measuring the expansion of the tube diameters; taking X-ray photographs of the tubes; realizing replicas of the surfaces of the tubes; wherein a tube is replaced when it fulfills at least one of the following conditions; the diameter expansion is higher than 3%; the X-ray photograph includes at least one crack; the replica shows a sufficient thermal ageing and/or creep deformation.

19 Claims, 2 Drawing Sheets

METHOD FOR REPLACING TUBES IN A REFORMING UNIT

This application is a §371 of International PCT Application PCT/FR2007/052560, filed Dec. 19, 2007.

FIELD OF THE INVENTION

The present invention relates to a method for replacing tubes of a furnace in a hydrocarbon steam reforming unit.

BACKGROUND

A process for reforming hydrocarbons or other sources of carbon and hydrogen, for example biomethanol, uses a combustion chamber comprising burners and tubes filled with catalysts that are capable of being passed through by a mixture of hydrocarbons and steam. The burners are arranged so as to transfer the heat from their combustion to the mixture of hydrocarbons and steam through the wall of the tubes, generally by radiation of the heat from the flame to the refractory walls of the combustion chamber. Such a process uses very high temperatures, generally of around 950 to 1050° C., close to the yield strength of the metal alloys of the tubes. This is why use is made of tubes that can be used at high temperatures, generally steel tubes comprising around 25% by weight of Cr and 35% by weight of Ni, optionally with the addition of elements such as Nb, Ti, W, Co and Zr. Nevertheless, even these tubes made of special alloys get damaged over time and risk breaking. The rupture of a tube is very punishing for the exploitation of the reforming process as it leads to the premature shutdown of the process in order to change the tube. The tubes are, in general, designed in order to have a service life of around 100 000 hours, at a given operating temperature known as the "design temperature" (a person skilled in the art commonly expresses this service life in years, life rounded off to 10 years); however, operating at a temperature 20° C. above the design temperature halves any service life of the tubes, the start-up phases, the changes in compositions of reaction mixtures also influence, often negatively, the service life of the tubes. It is therefore essential to be able to anticipate the moment when a tube risks breaking so as to be able to program its change during a maintenance phase of the furnace and not during its operation.

The objective of the present invention is to provide a method for replacing the tubes of a reforming furnace that makes it possible to avoid the unexpected rupture of these tubes during the operation of the furnace.

SUMMARY OF THE INVENTION

For this purpose, the invention relates to a method for replacing tubes in a unit for reforming hydrocarbons or other sources of carbon and hydrogen using a combustion chamber comprising burners and said tubes, said tubes being filled with catalyst and being capable of being passed through by a mixture of hydrocarbons and steam, the working life of each of said tubes being determined from the first use following its incorporation into said combustion chamber, the burners being arranged so as to transfer the heat from their combustion to the mixture of hydrocarbons and steam through the wall of the tubes, in which the following are carried out:
  measurements of the expansion of the external diameter of the tubes $\Delta D$, with $\Delta D = (D_t - D_0)/D_0 \times 100$, $D_0$ being the diameter of the virgin tube and $D_t$ being the diameter of the tube at the time of the measurement;
  X-ray photographs of the tubes;
  replicas of the outer surface of the tubes;
and in which a tube is replaced as soon as it meets at least one of the following conditions:
  its expansion in diameter $\Delta D$ is greater than 3%;
  its X-ray photograph exhibits at least one crack;
  its replica indicates:
    thermal aging such that the absence of secondary precipitates between the primary precipitates is observed; and/or
    creep damage such that the presence of strings of cavities and/or of grain boundaries is observed.

DETAILED DESCRIPTION OF THE INVENTION

Figure 1:
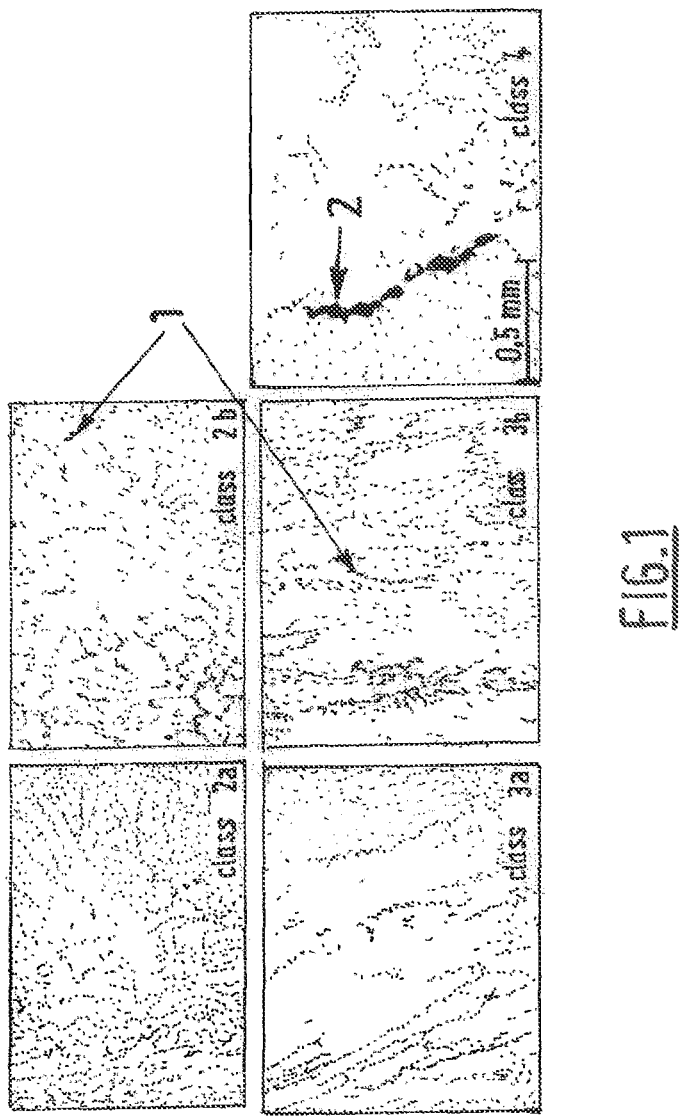
FIG. 1 illustrates the various classes 2a to 4 of creep damage.

The method according to the invention makes it possible to determine whether a tube must be replaced on the basis of at least three types of measurement. These measurements are carried out before each launch of a new production run. In general, a production run lasts at least two years. Its shutdown is generally programmed in advance for the maintenance of the operating unit. The tubes used are generally made from an HP type alloy.

According to one variant of the method, this method is characterized in that any tube for which the working life is at least equal to five years is replaced.

The working life of a tube is calculated from the moment when the tube is enclosed in the combustion chamber. Since the reforming processes operate continuously apart from technical shutdowns, the operating time (or working life) of a tube corresponds to the sum of the duration of the runs since its installation in the combustion chamber; the time devoted to technical shutdowns, whether they are programmed between two production runs or untimely, due to a malfunction, is of the order of a few days per year, it is possible to estimate these shutdown times to be less than 5% of the overall operating time; also they will, in general, be disregarded for estimating said working life of a tube. An anticipated changing of the tubes, relative to the service life for which they were designed (typically 100 000 hours) is a safety measure intended to take into account a risk of premature aging linked to overheating of the tubes. Complementary methods for controlling the progress of the reforming process could alternatively permit a better knowledge of the aging of the tubes and in some cases a longer working life of these tubes.

The first type of measurement concerns the expansion in the diameter of the tubes. Specifically, under the effect of heat, the tubes expand. The expansion in the diameter $\Delta D$ is deduced from the measurement of the diameter $D_t$ over the entire length of each tube: the value of $D_t$ corresponds to the largest diameter recorded over this length at the time of the measurement. This measurement is carried out on all the tubes of the combustion chamber before each launch of a new production run. Preferably, if in the course of the measurements of each tube, the tubes have an expansion in diameter $\Delta D$ between 2 and 3%, then at least one of said tubes is dismantled for a destructive analysis. The expression "destructive analysis" is understood to mean an analysis requiring the destruction of the tube; this is, for example, cutting up pieces of the tube to carry out a micrographic analysis or to machine samples with a view to carrying out creep and tensile tests.

The second type of measurement used in the method of the invention is the X-ray photograph of the tubes. For the tubes of a side-fired reformer, this X-ray photograph is taken level with its lowest weld located in the hottest part of the reformer. This type of measurement is carried out before the launch of a new production run on only 5% of all the tubes of the combustion chamber. These 5% of the tubes are chosen from the tubes subjected, during the previous production run, to the hottest temperatures; the selection is made based on the recordings of temperatures of the tubes taken during the previous production run. Then, at the end of the new production run, other tubes will be inspected, also representing 5% of all the tubes, following the same criterion.

Preferably, if a tube has to be replaced following its X-ray photograph, a new X-ray photograph is taken of a different 5% of the tubes before starting a new production run.

The third type of measurement used in the method of the invention is the production of replicas of the tubes. The measurement via replicas consists in taking an impression of the metallic surface of the tube and in making a metallurgical examination thereof. Specifically, it has been observed that the metallurgical state of the surface was a reflection of the metallurgical state of the inside of the tube. For the tubes of a side-fired reformer, the measurement via replicas is carried out on the part of the tube which is subjected to the highest temperatures during production; this part generally corresponds to the lower third. Before taking the impression, the surface of the outer wall of the tube is prepared by polishing, according to a technique known for studying the metallography of steels. The polishing is carried out until the polished surface has the appearance of a mirror. The polished surface is then chemically attacked with a suitable reactant, such as for example the marbling reactant having the following chemical composition: 4 g of copper sulfate, 20 ml of concentrated hydrochloric acid and 20 ml of demineralized water. After preparing the surface of the tube, the replica, composed for example of a film of acetate, is bonded to the surface in order to record the microstructure of the tube. The replica is then analyzed separately from the point of view of thermal aging and from the point of view of creep damage. In one embodiment, a replica is made of 5% of all the tubes. In another embodiment, if a tube is replaced following its replica, a replica of a different 5% of the tubes is again made before starting a new production run.

The analysis of the creep damage consists in classifying the surface according to one of the following classes by simple observation using a microscope:
class 0: virgin material never having been exposed to heat;
class 1: material under creep not exhibiting any cavities;
class 2a: material under advanced creep exhibiting isolated cavities;
class 2b: material under advanced creep exhibiting numerous cavities without preferred orientation;
class 3a: creep-damaged material exhibiting numerous oriented cavities;
class 3b: very creep-damaged material exhibiting strings of cavities and/or grain boundaries;
class 4: advanced creep damage exhibiting microcracks; and
class 5: very advanced creep damage exhibiting macrocracks.

This type of classification corresponds to the VGB-TW 507 standard described in VGB-TW 507: "Richtreihen zur Bewertung der Gefuegeausbildung und—schaedigung zeitstandbeanspruchter Werkstoffe von Hochdruckrohrleitungen and Kesselbauteilen. VGB Kraftwerkstechnik GmbH, Essen, 1992". FIG. 1 illustrates the various classes 2a to 4 of creep damage: the black spots 1 represents the cavities and a microcrack 2 is observed in class 4.

According to the invention, if a creep damage of class 3b or above is analyzed, the tube must be replaced.

The analysis of the thermal aging consists in classifying the surface according to one of the following classes by simple observation using a microscope:
class 0: virgin material never having been exposed to heat and never having undergone any thermal aging; the primary eutectic precipitates are well sized, clear and delineated around solidification cells and the austenitic matrix is free from secondary precipitates;
class 1: presence of very fine secondary precipitates between the primary precipitates;
class 2: presence of fine secondary precipitates between the primary precipitates;
class 3: slight presence of large secondary precipitates between the primary precipitates and signs of coalescence of the primary precipitates;
class 4: absence of secondary precipitates between the primary precipitates and presence of thick primary precipitates that tend to agglomerate; and
class 5: absence of secondary precipitates between the primary precipitates and presence of large agglomerated primary precipitates.

The primary eutectic precipitates have a size greater than the secondary precipitates. The primary precipitates are derived from the melting and solidification of the alloy of the tubes. The secondary precipitates are finer than the primary ones, a virgin alloy does not exhibit the latter: they only appear during the exposure of the alloy to heat. But, if the thermal aging is substantial, the secondary precipitates disappear.

Figure 2:
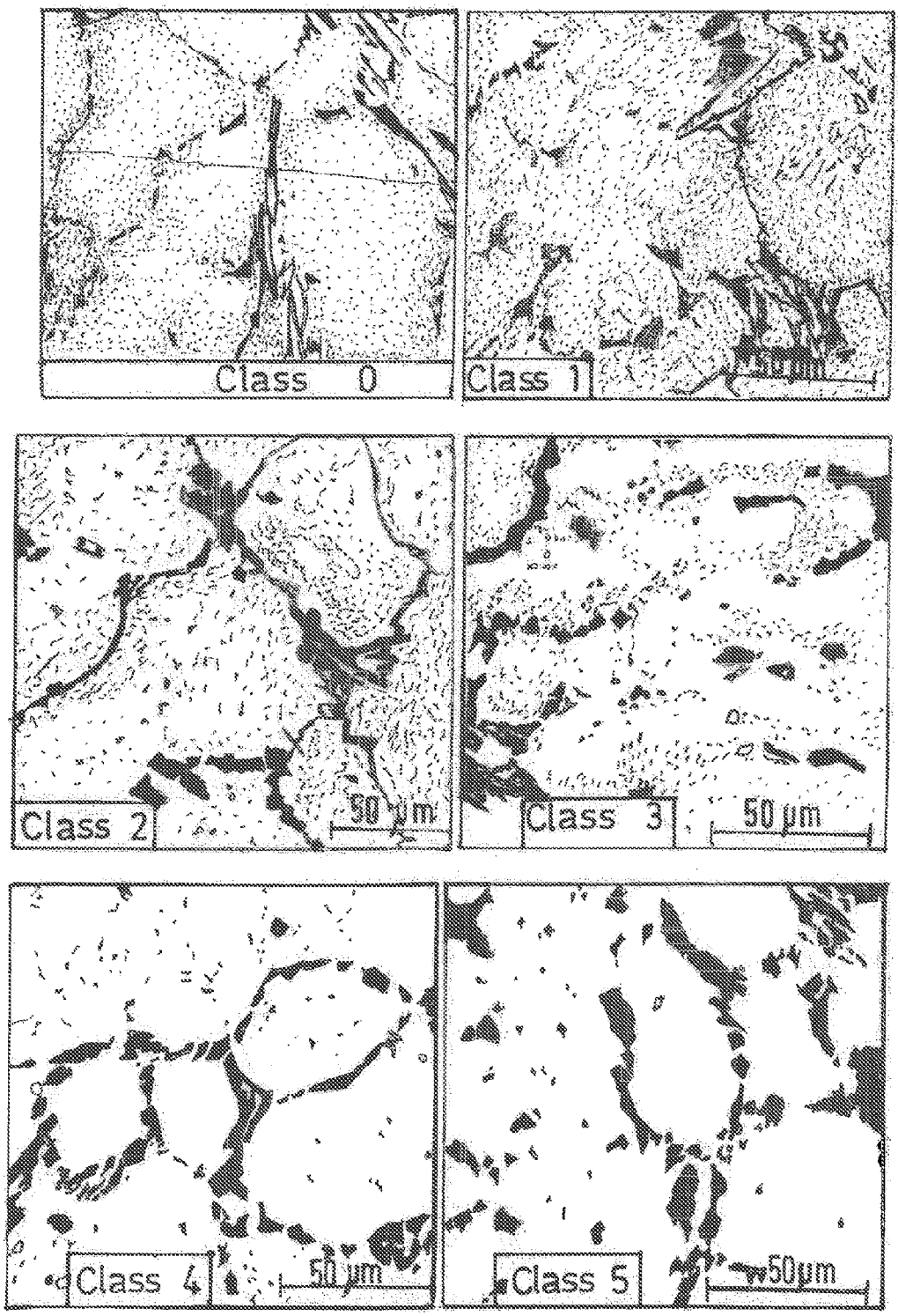
FIG. 2 illustrate the various classes 0 to 5 of thermal aging.

FIG. 2 illustrates the various classes 0 to 5 of thermal aging. According to the invention, if a thermal aging of class 4 or above is analyzed, the tube must be replaced.

The tubes replaced then undergo a destructive analysis in order to inspect the damage that they have undergone and to refine the general method for inspecting the tubes in order to take the decision to replace them.

What is claimed is:

1. A method for replacing tubes in a unit for reforming hydrocarbons or other sources of carbon and hydrogen using a combustion chamber comprising burners and tubes, each tube having a wall, a surface, and a working life, the tubes being filled with catalyst and being capable of being passed through by a mixture of hydrocarbons and steam, the working life of each of the tubes being determined from the first use following its incorporation into the combustion chamber, the burners being arranged so as to transfer heat from their combustion to the mixture of hydrocarbons and steam through the wall of the tubes, wherein with each launch of a new production run the following steps are carried out:
taking X-ray photographs of the tubes;
making a replica of the outer surface of the tubes;
inspecting said X-ray photographs and said replicas; and
replacing a tube with a new tube when,
its replica indicates thermal aging such that an absence of secondary precipitates between primary precipitates is observed.

2. The method of claim 1, wherein any tube for which the working life is at least equal to five years is replaced.

3. The method of claim 1, further comprising the step of taking measurements of an expansion of the diameter of the tubes $\Delta D$, with $\Delta D = (D_t - D_0)/D_0 \times 100$, $D_0$ being the diameter of the virgin tube and $D_t$ being the diameter of the tube at the time of the measurement, wherein the expansion in diameter $\Delta D$ of each tube of the combustion chamber is measured.

4. The method of claim 1, further comprising the step of taking measurements of the expansion of the diameter of the tubes $\Delta D$, with $\Delta D=(D_t-D_0)/D_0\times 100$, $D_0$ being the diameter of the virgin tube and $D_t$ being the diameter of the tube at the time of the measurement, wherein the expansion in diameter $\Delta D$ is measured over the entire length of each tube.

5. The method of claim 3, wherein the expansion in diameter $\Delta D$ is measured over the entire length of each tube.

6. The method of claim 1, further comprising the step of taking measurements of an expansion of the diameter of the tubes $\Delta D$, with $\Delta D=(D_t-D_0)/D_0\times 100$, $D_0$ being the diameter of the virgin tube and $D_t$ being the diameter of the tube at the time of the measurement, wherein if the expansion in diameter of $\Delta D$ is between 2 and 3%, at least one of said tubes is dismantled for a destructive analysis.

7. The method of claim 5, wherein if the expansion in diameter of $\Delta D$ is between 2 and 3%, at least one of said tubes is dismantled for a destructive analysis.

8. The method of claim 1, wherein for the tubes of a side-fired reformer, an X-ray photograph of the tube is taken level with its lowest weld located in the hottest part of the reformer.

9. The method of claim 7, wherein for the tubes of a side-fired reformer, an X-ray photograph of the tube is taken level with its lowest weld located in the hottest part of the reformer.

10. The method of claim 1, wherein an X-ray photograph is taken for 5% of all the tubes.

11. The method of claim 1, wherein if a tube is replaced following its X-ray photograph, an X-ray photograph is again taken of a different 5% of the tubes before starting a new production run.

12. The method of claim 1, wherein the replica of the tube is made on the part of the tube which is subjected to the highest temperatures during production.

13. The method of claim 5, wherein the replica of the tube is made on a part of the tube which is subjected to the highest temperatures during production.

14. The method of claim 1, wherein a replica is made of 5% of all the tubes.

15. The method of claim 1, wherein if a tube is replaced following its replica, a replica of a different 5% of the tubes is again made before starting a new production run.

16. The method of claim 1, wherein the step of making replicas of the surface of the tubes further comprises the steps of polishing the surface of the tube until the surface is substantially reflective; chemically attacking the surface with a reactant; bonding a film to the surface of the tube; and removing the film from the surface of the tube to create the replica.

17. The method of claim 16, wherein the reactant comprises an effective amount of copper sulphate, an effective amount of hydrochloric acid, and an effective amount of demineralised water.

18. The method of claim 16, wherein the reactant comprises about 4 g copper sulphate, about 20 ml of HCl acid, and about 20 ml of demineralised water.

19. The method of claim 16, wherein the film comprises acetate.

\* \* \* \* \*